No. 772,125. PATENTED OCT. 11, 1904.
E. E. BLAKE.
SWEEP RAKE.
APPLICATION FILED JULY 15, 1901. RENEWED OCT. 3, 1902.
NO MODEL. 2 SHEETS—SHEET 1.
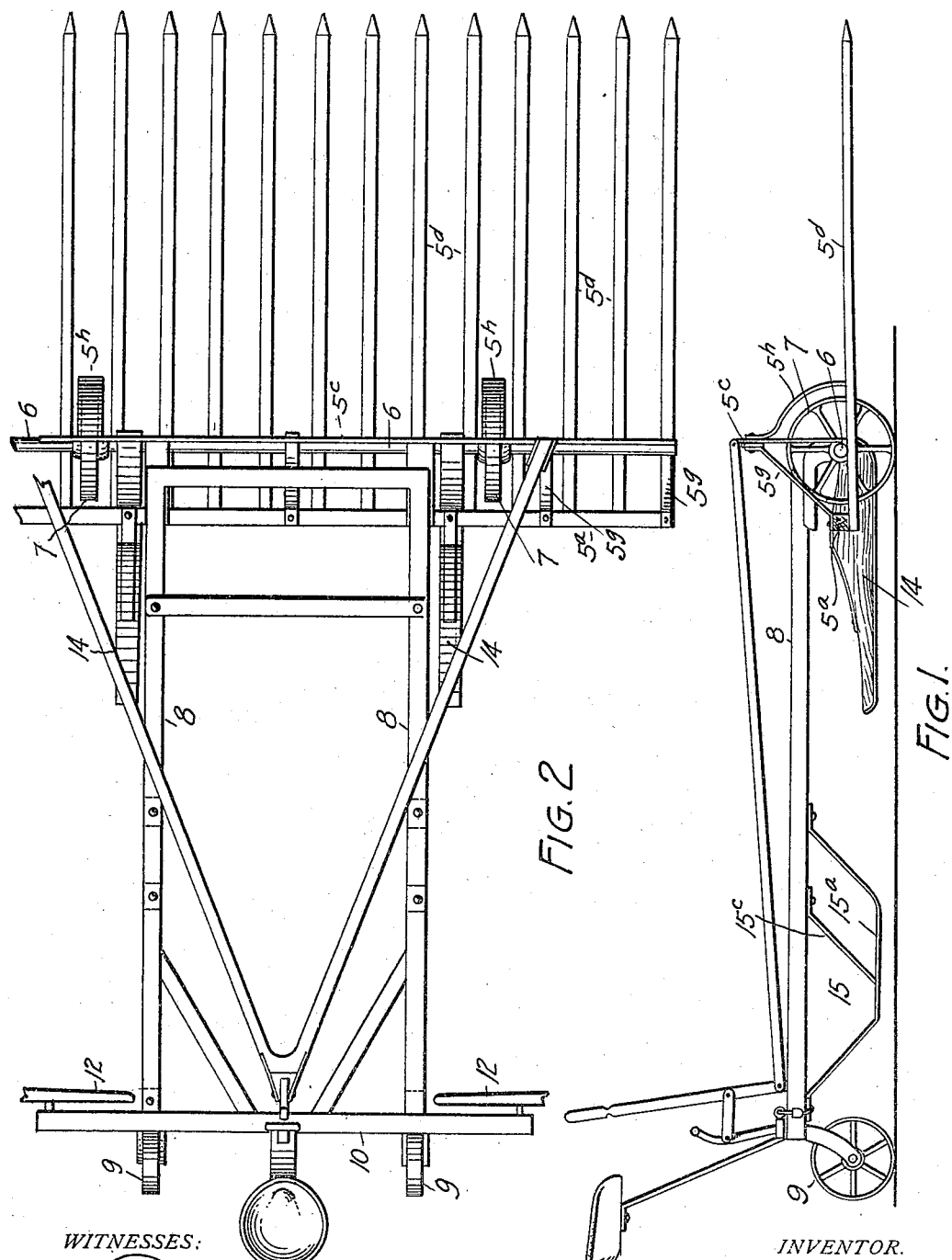
WITNESSES: INVENTOR.
E. E. Blake.
BY
ATTORNEY.

No. 772,125. PATENTED OCT. 11, 1904.
E. E. BLAKE.
SWEEP RAKE.
APPLICATION FILED JULY 15, 1901. RENEWED OCT. 3, 1902.
NO MODEL. 2 SHEETS—SHEET 2.
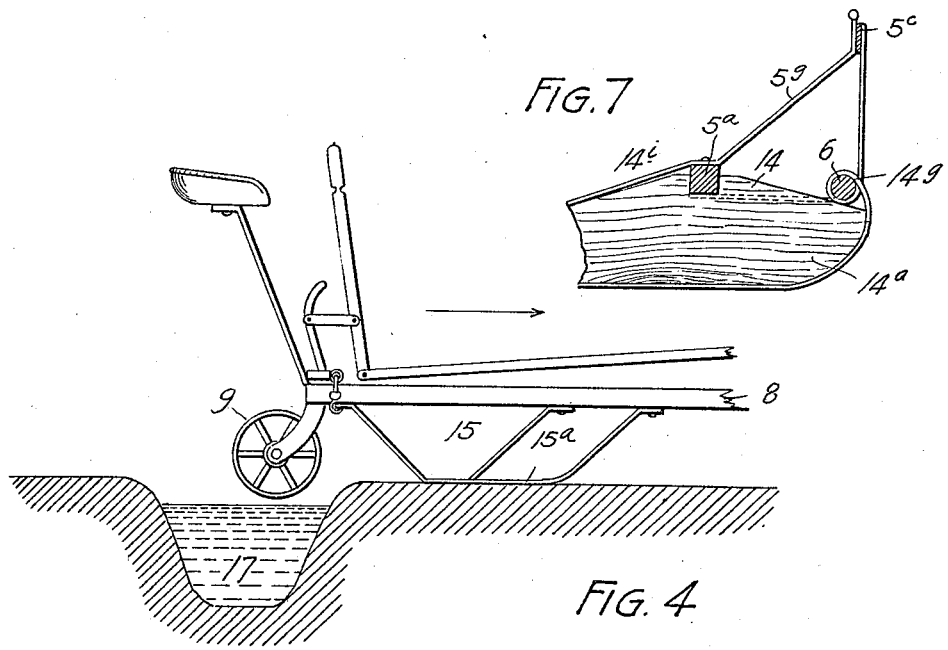
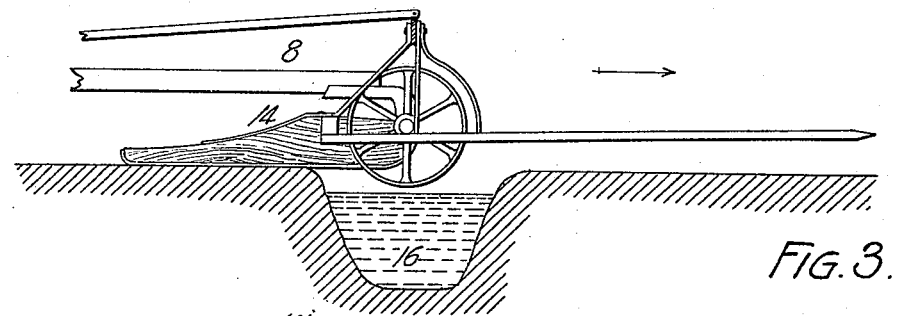
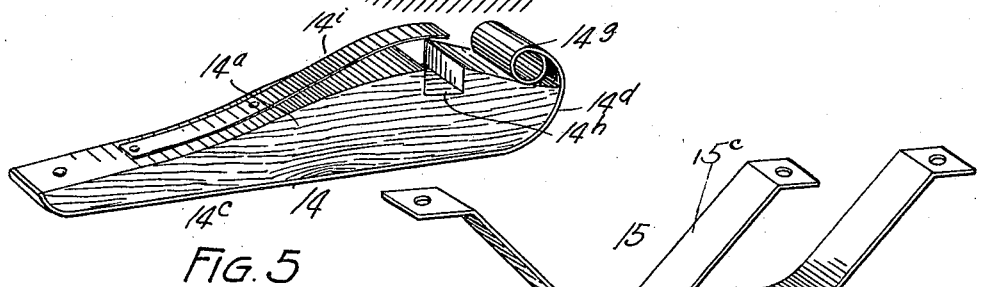
WITNESSES: INVENTOR.
E. E. Blake No. 772,125. Patented October 11, 1904.

UNITED STATES PATENT OFFICE.

EDWARD E. BLAKE, OF FOWLER, COLORADO.

SWEEP-RAKE.

SPECIFICATION forming part of Letters Patent No. 772,125, dated October 11, 1904.

Application filed July 15, 1901. Renewed October 3, 1902. Serial No. 125,753. (No model.)

*To all whom it may concern:*

Be it known that I, EDWARD E. BLAKE, a citizen of the United States of America, residing at Fowler, in the county of Otero and State of Colorado, have invented certain new and useful Improvements in Sweep-Rakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hay-rakes of the class generally known as "sweep-rakes," being adapted for use in carrying the hay to the stacker after it has been gathered into windrows by the ordinary field-rake. My object is to provide an attachment for an implement of this class which shall adapt it for use in crossing irrigating-ditches without difficulty. Heretofore, so far as I am aware, special bridges independent of the implement have been necessary in crossing these ditches, thus causing much annoyance and delay in the progress of the work.

In arid regions, where irrigation is necessary, many branch ditches or laterals are formed in the land in order to irrigate the ground for crops. By virtue of my improvement these ditches or laterals may be crossed without difficulty and, in fact, as easily as if the ground were smooth or without ditches.

My improvement consists, generically stated, of means attached to the implement and normally occupying a position suitably above the surface of the ground, but adapted to engage the ground and form a support for the implement, whereby the wheels are suspended while crossing these ditches, but engage the ground and take up the burden of the machine as soon as the wheels have passed over the ditch.

The invention will now be described in detail, reference being made to the accompanying drawings, in which is illustrated an embodiment thereof.

In the drawings, Figure 1 is a side elevation of a sweep-rake equipped with my improvements. Fig. 2 is a top or plan view of the same, the head being partly broken away on one side for lack of space on the sheet. Fig. 3 shows the front part of the machine crossing a ditch, the main wheels being suspended. Fig. 4 shows the rear part crossing the ditch, the caster-wheels being suspended. Fig. 5 is a perspective view in detail of the forward shoe or runner. Fig. 6 is a similar view of the rear shoe or runner. Fig. 7 is a section taken through the rake-head, showing the forward shoe in place.

In the drawings my improvement is shown applied to what is known on the market as the "Dain" rake, though it must be understood that my improvements may be applied to any other rake of similar general construction or adapted to perform the same purposes. Hence it must be understood that I do not limit the invention to its use on this identical rake, as I am aware that it is equally applicable to other implements on the market, and therefore claim the right to its use on any other construction to which it may be attached.

The general construction of the implement shown in the drawings is not of my invention; but the same will be briefly described in order that the utility of my improvements may be thoroughly understood and appreciated.

The same reference characters indicate the same parts in all the views.

Let the numeral 5 designate the rake-head, which is composed of transverse bars $5^a$ and $5^c$, teeth $5^d$, and braces $5^g$ and $5^h$. To this head is attached the axle 6, upon which are journaled the main supporting ground-wheels 7. To this head are secured the thills 8, which are suitably separated and extend rearwardly from the head, their rear extremities being supported by caster-wheels 9. Secured to the rear portion of the thills 8 is a transverse bar 10, to the extremities of which are respectively secured the whiffletrees 12. When the machine is in use, a horse is attached to each whiffletree on opposite sides of the thills 8. The horses therefore travel in the rear of the rake-head and may be said to shove or force the implement in front of them.

My improvement, as shown in the drawings, consists of two supports or runners 14, applied to the rake-head, and two other supports, runners, or shoes 15, one being applied to each thill forward of its caster-wheel. The runners 14 consist, as shown in the drawings, of a metal (preferably steel) shoe $14^c$, applied to a piece of wood $14^a$. The forward extremity of the metal shoe is curved upwardly in front, as shown at $14^d$, and bent around and secured to the axle, as shown at $14^g$. The part $14^a$ is provided with a recess $14^h$, formed in the top and adapted to receive the bar $5^a$ of the head. Each runner is provided with a top brace $14^i$, whose forward extremity is located above the bar $5^a$. The runner is secured to the bar by passing bolts or other suitable fastening devices through the forward extremities of the braces. These bolts pass through the bar into the shoe and hold the latter securely in place. Hence these shoes are rigidly secured to the implement. They are located as nearly as practicable to the wheels and extend rearwardly from the axle. They are of sufficient length and so located that as the wheels 7 come to the ditch which is designated 16 in the drawings the frame of the machine lowers slightly until the runners 14 rest upon the ground. The wheels are then suspended and remain in this position while crossing the ditch, the runners being of sufficient length to support the implement until the wheels engage the opposite bank and again take up the burden of the machine or enter upon the performance of their normal function, the runners being again raised slightly from the surface. The wheels first engage the opposite bank of the ditch slightly below the level of the surface and travel upward easily to their normal level without subjecting the machine to any concussion, shake, or jar.

The runners 15 perform the same function for the caster-wheels that the runners 14 perform for the main wheels of the machine. As shown in the drawings, each of these runners 15 is formed of a piece of steel $15^a$, bent downwardly between its extremities, which are secured to the thills 8 by bolts or other suitable fastening devices. To the central part $15^d$ of the steel shoe is applied one extremity of a brace $15^c$, whose opposite extremity is secured to the thill on the under side. These runners 15 are so arranged that their forward extremities occupy a position above the forward bank of the ditch before the caster-wheels 9 reach the ditch. Then as these wheels enter the ditch the rear part of the implement settles gradually, bringing the runners into contact with the surface, whereby the machine is supported in operative position until the suspended caster-wheels have crossed the ditch and taken up the burden, the runners being again raised to their normal position.

In Fig. 4 the caster-wheels are shown crossing the ditch which is designated by the numeral 17. In Fig. 3 the main wheels of the machine are shown crossing the ditch.

It must be understood that I do not limit my improvement to the special construction of shoes or runners shown in the drawings, as I am aware that the exact construction of these parts is not material, the only requisite being that devices be employed which shall properly perform the function stated.

From the foregoing description it is believed that the use and advantages of my improvements will be readily understood. By means of my improved devices the rake when loaded with hay or otherwise will pass over a ditch as easily and safely as if the ditch were not there. The arrows in Figs. 3 and 4 indicate the direction of travel.

Having thus described my invention, what I claim is—

1. In an implement of the class described, the combination with a frame and front and rear ground-wheels, of forward and rear shoes or runners attached to the framework of the implement and normally occupying a position above the surface which the wheels engage, the rear shoes or runners located forward of the rear wheels, and the forward shoes or runners rearward from the front wheels, whereby the forward part of the implement is supported by the engagement of the forward shoes or runners with the rear bank of the ditch, while the forward wheels are suspended in passing over the ditch; the rear part of the machine being supported by the engagement of the rear shoes or runners with the forward bank of the ditch, while the rear wheels are suspended in passing over the ditch, the length of the shoes or runners being arranged with reference to the ditch to be crossed, whereby the shoes will support the burden of the machine until the wheels are in position to engage the forward bank.

2. In an implement of the class described, the combination with a framework, a pair of front ground-wheels and a pair of rear ground-wheels, of a pair of forward shoes or runners mounted on the frame and extending rearwardly from the forward wheels, and a pair of shoes or runners mounted on the frame and located forward of the rear wheels, the position of the shoes or runners with reference to the ground-wheels being uniform or constant.

3. In a hay-rake, the combination with a wheeled rake-head, and a lifting-frame pivoted to it and having a ground-wheel at its rear part; of an auxiliary support for the said frame rigidly secured to it in front of its said wheel, said support being normally clear of the ground and coming into contact with it when the said wheel drops into a depression.

In testimony whereof I affix my signature in presence of two witnesses.

EDWARD E. BLAKE.

Witnesses:
    U. S. RINGER,
    EVA TALLEY.